Patented Oct. 30, 1928.

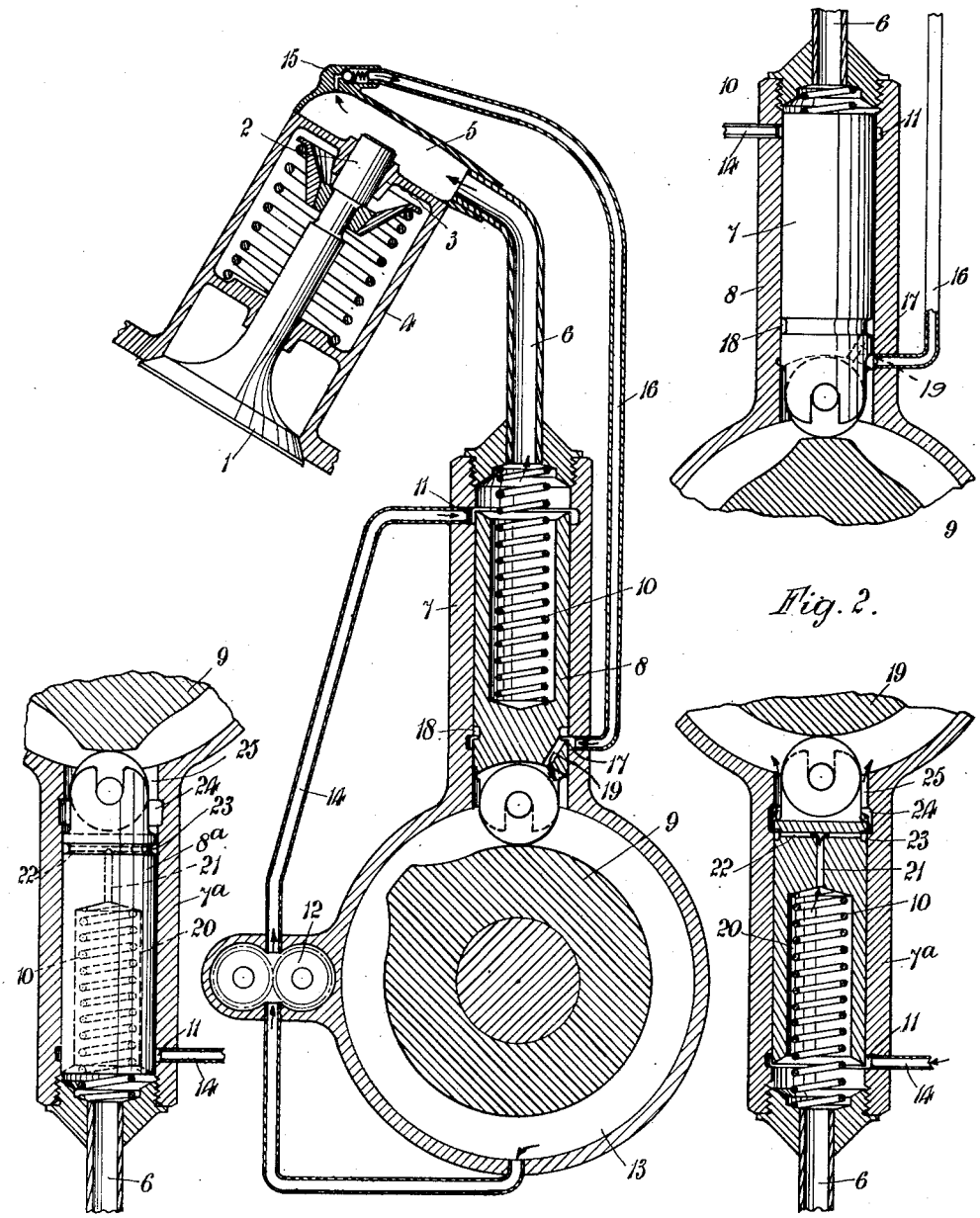

1,690,032

UNITED STATES PATENT OFFICE.

WARREN NOBLE AND LEON V. PITTMAN, OF DETROIT, MICHIGAN; SAID PITTMAN ASSIGNOR TO SAID NOBLE.

HYDRAULIC VALVE GEAR.

Application filed April 25, 1927. Serial No. 186,275.

This invention relates to hydraulic valve gears or similar hydraulic member-operating devices of the type wherein a closed column of oil is utilized as motion transmitting means between an actuating member and an actuated member, such as between a valve tappet and a cylinder valve, respectively, of an engine, and in the co-pending application of Warren Noble, Serial Number 180,119, filed the 1st day of April, 1927, is described a hydraulic valve gear adapted to perform the required valve lifting functions and provided with a manually operable air bleed valve for the purpose of bleeding air from an actuator head forming a high point in the casing of the said oil column.

The present invention has for its object to provide a form of a timed positively controlled means for bleeding air from a hydraulic system, such as of the type referred to, by flowing oil (or such fluid as may be utilized in the system), through the actuator casing and from a high point in said casing, and restricting said flow to periods of actuating impulse on the oil column, whereby any accumulated air will be eliminated from the oil column casing and between said actuating impulses. A further object of the invention is to utilize such flow for the ensuring of replenishing of oil in the oil column casing as well as the eliminating of air as aforesaid.

Still further, the said invention has for its object to utilize the overflow from the oil column casing, resulting from the passing of oil therefrom through an air bleed outlet, to effect lubrication of parts of the engine or apparatus to which the device is applied.

Still further, the said invention has for its object to provide tappet-controlled means closing all passages to the oil column as the tappet commences its actuating stroke and opening a passage to flow through the oil column at some period after the tappet has completed its actuating stroke, together with pumping means ensuring such oil flow prior to the effecting of the succeeding actuating stroke of said plunger.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, we may provide an engine with a hydraulic valve gear having an oil column casing in the form of a chambered actuator head, to the interior of which head the valve stem of the engine is exposed and subject to a hydraulic pressure within the said head, and an actuator cylinder communicating with the said head; and a cam operated plunger in said actuator cylinder adapted by reciprocation to exert intermittent pressure on said valve stem through a column of oil in said oil column casing. The pressure oil inlet to said cylinder is closed by said plunger, except when in its position of rest on the base circle of its cam, an air bleed pipe leading from a high point in said oil column casing to a second port in said oil column cylinder, which latter port is also opened and closed by said plunger simultaneously with the opening and closing of said first mentioned port, said plunger being adapted to provide, when in its port-disclosing position, a spillway to the mechanism beneath said plunger, and means for supplying pressure oil to said first mentioned port.

All of which is more particularly described and ascertained hereinafter, by way of example, having reference to the accompanying drawing, wherein:—

Figure 1 is a schematic sectional view of a hydraulic valve gear embodying the said invention;

Figure 2 is a fragmentary sectional view of the same illustrating the plunger in its port-closing position and on its actuating stroke.

Figure 3 is a similar view to Figure 2 illustrating the port arrangement of an inverted plunger, such as may be utilized where the actuator head is below the actuator, with the actuator cylinder forming the high point of the oil column casing; and Figure 4 is a similar view to Figure 3, but with the plunger also shown in section, illustrating the plunger in its valve opening or non-actuating position.

Similar characters of reference indicate similar parts in the several figures of the drawing.

1 indicates an engine puppet valve, having a stem 2 the upper end of which is slidable in a cylinder boss 3 in the upper end a valve casing 4, on which end of the said casing is mounted a chambered actuator head 5, so that the extremity of the said valve stem 2 is exposed to the interior of said chamber. 6 is an actuator pipe forming a connection between the actuator head 5 and the upper end of an actuator cylinder 7, which has an actuator plunger 8 slidable therein under the influence of a cam 9 and against the resistance of an actuator spring 10 within the said actuator cylinder.

The cylinder 7, connecting pipe 6 and actuator head 5 form the casing for an oil column adapted to transmit impulses from the plunger to the valve stem in a manner more particularly described in the co-pending application hereinbefore referred to, and 11 is a port in the said cylinder 7 from which pressure oil is introduced to the said oil column casing for replenishing loss due to leakage or otherwise, and more particularly, in so far as this invention is concerned, for facilitating an elimination of entrained or accumulated air from the oil column casing in a manner to be described.

12 is an oil pump fed from a reservoir 13, and having a discharge pipe 14 communicating with the port 11 of the said cylinder 7.

As shown in Figure 1, the upper end of the plunger discloses the said port 11 when the said plunger is at its lowermost position, dwelling on the base circle of the said cam 9, so that, in this position of the parts, pressure oil is admitted through the said port 11 to the oil column casing; and it will be noted that from a high point of the oil casing, which, in the case of the said Figure 1, is the actuator head, an outlet port 15 is provided from which a pipe or walled passage 16 leads to a port 17 in the lower part of the said cylinder 7.

The plunger 8 is annularly recessed near its lower end at 18, and ported at 19 from said recess to provide a spillway communicating with the said port 17 when the said plunger is in its lowermost or pre-actuating position. Therefore, in such position of the plunger, a flow passage is provided from the said pump through the oil casing, the outlet 15 of the actuator head, pipe 16 and the ports 17, 18 and 19, which flow passage provides for the replenishing of oil in the oil column casing when the plunger is in such position, and also provides for the elimination of any air which may have accumulated in the actuator head as the highest point of the oil column casing.

By providing proportionally greater area of the plunger relative to the valve stem a proportionally low plunger lift relative to the lift of the valve stem, is possible, and with a slow speed cam having long dwell, a short cam travel may be utilized, thus providing for sufficiently long continued maintenance of the port-open position of the plunger to ensure thorough scavenging of air from the actuator head, and also from pipe 16 which, in this example, becomes part of the oil column in so far as its closed nature is concerned.

After such air scavenging and oil replenishing has taken place, the plunger commences its actuating stroke under the influence of the cam, and, in its initial movement, closes the ports 11 and 17, thereby trapping a solid column of oil between the said plunger and the valve stem so that positive movement is imparted through the column of oil to the valve stem as required.

It sometimes occurs, such as in an engine having inverted cylinders, that the actuator head is below the actuator cylinder so that, in such case, the actuator cylinder becomes the high point of the oil column, and to meet such a condition, I may adopt an arrangement of ports shown in Figures 3 and 4. wherein the actuator cylinder 7$^a$ and the plunger 8$^a$ are inverted so that the cam 9 is overhead and the actuator pipe 6 extends from the lower end of the actuator cylinder. 11 and 14 are the pressure oil feed pipe and the pressure oil feed port, respectively, opening into the actuator cylinder near the end remote from the cam, and the bore of the plunger, in which the actuator spring 10 is housed, forms the air trap of the oil column casing. For this reason, an air outlet passage 21, corresponding to the air outlet passage 15 of the first described example, is provided in the plunger 8$^a$ and extends from the inner end of the bore 20 thereof to a transverse passage 22 communicating with an annular recess 23 near the inner or cam end of the plunger.

When the plunger 8$^a$ is actuated by its cam, the port 11 and recess 23 are closed against flow therethrough, but in the dwell position of the plunger, shown in Figure 4, the port 11 opens to the interior of the oil column casing, including the bore of said chamber of 7$^a$, and the annular recess 22 communicates with an annular recess or port 23 in the surrounding wall of the actuator cylinder 7$^a$, which in turn communicates with a passage 24 providing an outlet for air and oil from the oil column casing when the said plunger 7$^a$ is in this position. The oil-replenishing and the air-scavenging action takes place in this position of the plunger in the manner already described with reference to Figures 1 and 2.

The described method of oil replenishing and air scavenging in a hydraulic actuator system is quite effective where slight lost motion is permissible in the actuating stroke of the plunger, as, of course, such actuating stroke does not became fully effective until sufficient movement has taken place to close the oil column, but this lost motion can be minimized by proper proportioning of the parts to provide an efficient flow for the purposes through the ports, with a minimum lift of plunger to close the ports.

This invention may be developed within the scope of the following claims without departing from the essential features of the said invention, and it is desired that the specification and drawings be read as being merely illustrative and not in a limiting sense, except as necessitated by the prior art.

What we claim is:—

1. In combination with a puppet valve, valve closing means, valve actuating means, including a hydraulic fluid casing to the interior of which the stem of said valve is exposed, an actuator cylinder forming part of said casing, said cylinder having a fluid supply port therein, means supplying fluid under pressure through said port to said cylinder, valve actuating plunger reciprocable in said cylinder, plunger operating means, and a relief conduit extending from a region of air accumulation in said casing, said fluid supply port and the outlet of said relief conduit being closed by said plunger when it is in a valve-unseating position, substantially as described.

2. In combination with a puppet valve, valve closing means, a hydraulic fluid casing including a chambered actuator head to the interior of which the stem of said valve is exposed, an actuator cylinder communicating with said head, a cam-operated plunger in said cylinder, said cylinder having pressure oil inlet thereto, said plunger closing said inlet except when in a position of rest on the base circle of its cam, an air bleed conduit leading from a region of air accumulation in said casing to a second port in said cylinder, the lower part of said plunger closing said second port when said plunger is raised by said cam and disclosing said second port when said plunger is at rest on the base circle of its cam to permit discharge from said air bleed conduit under the influence of incoming oil to said cylinder to said supply port, substantially as described.

3. In combination with a puppet valve, valve closing means, a chambered actuator head to the interior of which the stem of said valve is exposed, an actuator cylinder communicating with said head, a cam-operated plunger in said cylinder, a fluid supply port to said cylinder immediately in advance of said plunger when at rest on the base circle of its cam, said cylinder having a second port immediately in advance of the rear end of said plunger and opened thereby when in its rest position, and an air bleed conduit leading from a region of air accumulation in said actuator head to said second port, substantially as described.

4. The combination, according to claim 1, including a non-return check valve in said relief conduit.

5. In combination with a puppet valve, valve closing means, valve actuating means, including a hydraulic fluid casing to the interior of which the stem of said valve is exposed, fluid inlet and exhaust passages to and from said casing, and a valve actuating plunger operating said valve through the medium of fluid in said casing, said plunger closing both of said passages when in a valve-opening position, and disclosing said passages to permit flow through said casing when in other than a valve-opening position.

In testimony whereof we affix our signatures.

WARREN NOBLE.
LEON V. PITTMAN.